(12) United States Patent
Liu et al.

(10) Patent No.: US 8,611,350 B2
(45) Date of Patent: *Dec. 17, 2013

(54) APPARATUS AND METHOD FOR LAYER-2 TO 7 SEARCH ENGINE FOR HIGH SPEED NETWORK APPLICATION

(75) Inventors: Yung-Chung Liu, Taipei (TW); Xi Chen, Fremont, CA (US); Yu-Chih Tsao, Taipei (TW); Chien-Hsiung Chang, Jhubei (TW); Chien-Chih Chen, Toufen (TW); Xiaochong Cao, Fremont, CA (US); Chih-Hsien Hsu, Hsinchu (TW)

(73) Assignee: Cortina Systems, Inc., Sunnyvale, CA (US)

( * ) Notice: Subject to any disclaimer, the term of this patent is extended or adjusted under 35 U.S.C. 154(b) by 428 days.

This patent is subject to a terminal disclaimer.

(21) Appl. No.: 12/966,940

(22) Filed: Dec. 13, 2010

(65) Prior Publication Data

US 2011/0080913 A1    Apr. 7, 2011

Related U.S. Application Data

(63) Continuation of application No. 11/775,833, filed on Jul. 10, 2007, now Pat. No. 7,852,843.

(60) Provisional application No. 60/807,992, filed on Jul. 21, 2006.

(51) Int. Cl.
*H04L 12/66* (2006.01)
*H04L 12/44* (2006.01)
*H04L 12/56* (2011.01)

(52) U.S. Cl.
USPC ............ 370/392; 370/389; 370/401; 370/469

(58) Field of Classification Search
USPC ......... 370/252, 389, 390, 392, 401, 428, 469; 709/217–219
See application file for complete search history.

(56) References Cited

U.S. PATENT DOCUMENTS

| | | | | |
|---|---|---|---|---|
| 6,032,190 | A  * | 2/2000  | Bremer et al. | 370/389 |
| 6,401,117 | B1 * | 6/2002  | Narad et al. | 709/223 |
| 6,424,659 | B2 * | 7/2002  | Viswanadham et al. | 370/469 |
| 2001/0043614 | A1 * | 11/2001 | Viswanadham et al. | 370/469 |
| 2004/0010612 | A1 * | 1/2004  | Pandya | 709/213 |
| 2004/0205145 | A1 * | 10/2004 | Murakami | 709/213 |
| 2005/0141501 | A1 * | 6/2005  | Kadambi et al. | 370/389 |
| 2005/0232270 | A1 * | 10/2005 | Bass et al. | 370/389 |
| 2006/0002386 | A1 * | 1/2006  | Yik et al. | 370/389 |
| 2006/0023744 | A1 * | 2/2006  | Chen et al. | 370/466 |
| 2006/0133377 | A1 * | 6/2006  | Jain | 370/392 |
| 2006/0136570 | A1 * | 6/2006  | Pandya | 709/217 |
| 2006/0168270 | A1 * | 7/2006  | Townsley et al. | 709/230 |
| 2006/0203721 | A1 * | 9/2006  | Hsieh et al. | 370/389 |
| 2007/0133560 | A1 * | 6/2007  | Nam et al. | 370/395.31 |

* cited by examiner

*Primary Examiner* — Ian N Moore
*Assistant Examiner* — Jenee Alexander
(74) *Attorney, Agent, or Firm* — Ishimaru & Associates LLP

(57) ABSTRACT

High-speed networking application equipments with a layer-2 to layer-7 hardware search engine and method are with flexibility and performance improvement. The multi-layer switches/routers, network address translation (NAT) gateway, firewall/VPN router and network attached storage (NAS) may use the search engine for fast and efficient search requirement.

19 Claims, 2 Drawing Sheets

APPARATUS AND METHOD FOR LAYER-2 TO 7 SEARCH ENGINE FOR HIGH SPEED NETWORK APPLICATION

CROSS-REFERENCE TO RELATED APPLICATION(S)

This application is a continuation of U.S. Non Provisional patent application Ser. No. 11/775,833 filed Jul. 10, 2007, now U.S. Pat. No. 7,852,843, which claims the benefit of U.S. Provisional Patent Application Ser. No. 60/807,992 filed Jul. 21, 2006, and the subject matter thereof is incorporated herein by reference thereto.

BACKGROUND OF THE INVENTION

1. Field of the Invention

The present invention relates to a search engine and method for high-speed network application, more specially, to an apparatus and method providing information search from layer-2 to layer-7 in the OSI network layers.

2. Description of the Prior Art

An internet, including but not limited to, the Internet, intranets, extranets and similar networks, is a world-wide network of computers, where each computer is identified by a unique address. The addresses are logically subdivided into domains or domain names (e.g. ibm.com, pbs.org, and oranda.net), which allow users to reference the various addresses. A web, including but not limited to the World Wide Web (WWW) is a group of these computers accessible to each other via a common communication protocol, or language, including but not limited to Hypertext Transfer Protocol (HTTP).

As computer performance has increased in many years, the demands on computer networks has significantly increased; faster computer processors and higher memory capabilities drive the needs for networks with high bandwidth capabilities to enable high speed transfer of significant amounts of data. The well-known Ethernet technology, which is based on the IEEE 802.3 standards, is one example of computer networking technology which has gone through many modifications and improvements to remain a viable computer networking technology. Based upon the Open Systems Interconnect (OSI) 7-layer reference model, network capabilities have grown through the development of repeaters, bridges, routers, and switches, which operate with various types of communication media. Switches or routers are hardware-based devices which control the flow of data packets or cells based upon destination address information that is available in each packet. A properly designed and implemented switch or router should be capable of receiving a packet and forwarding it to an appropriate output port at what is referred to wire-speed or line-speed, which is the maximum speed capability of the particular network technology. Currently, Ethernet wire-speed typically ranges from 10 Megabits per second (Mps) up to 10,000 Mps, or 10 Gigabits per second. As speed has increased, design constraints and requirements have become more and more complex with respect to following appropriate design and protocol rules and providing a low cost, commercially viable solution.

In such a network, packets are transmitted from a source device to a destination device; and these packets can travel through one or more switches and/or routers. Standards have been set to define the packet structure and layers of functionality and sophistication of a network. For example, the TCP/IP protocol stack defines four distinct layers, namely, the physical layer (layer-1), data link layer (layer-2), network layer (layer-3), transport layer (layer-4). A network device may be capable of supporting one or more of the layers and refers to particular fields of the packet header accordingly. Typical LANs are comprised of a combination of Layer-2 (data link layer) and Layer-3 (network layer) network devices. In order to meet the ever increasing performance demands for the network, functionality that has been traditionally performed in software and/or in separate layer-2 or layer-3 devices have migrated into one multi-layer device or switch that implements the performance critical functions in hardware.

Another function of data networks is the routing of data packets or frames from a source network node to one or more destination network nodes. When a network device receives a packet or frame, the device examines the packet or frame in order to determine how the packet or frame is to be forwarded. Similar forwarding decisions are made as necessary at multiple intermediate network devices until the packet or frame is received at the desired destination node. This type of operation is in contrast to networks employing circuit-switching techniques, in which routes are pre-established as "circuits" and each network device simply forwards each received packet on its associated circuit. One example of a routed network is the Internet, which employs a protocol known as the Internet Protocol (IP) for routing data packets through the Internet.

The Transport Control Protocol/Internet Protocol (TCP/IP) suite of protocols is used in many of today's networks. A TCP/IP-based network, such as the Internet, provides a data packet routing system for communication between nodes (e.g., end-user workstations, servers, network devices, etc.) connected to the Internet. In traditional destination address based routing, a source node specifies a destination Internet protocol (IP) address for the IP address of the destination node in an IP datagram. The IP datagram is encapsulated in a physical frame, or packet, and sent to a router attached to the network of the source node. The router receiving the frame parses the IP datagram to determine the outgoing port for the next router or the destination node. The router selects the next router enroute to the destination node and again encapsulates the datagram in a physical frame for transmission to the next router. This process continues until the IP datagram reaches the network to which the destination node is connected.

SUMMARY OF THE INVENTION

In view of the above problems associated with the related art, it is an object of the present invention to provide an apparatus for layer-2 to layer-7 search engine for high-speed network application. The invention searches the matched fields and modifies and stores them for different uses according to the functions.

It is another object of the present invention to provide a method for layer-2 to layer-7 search engine for high-speed network application. The method searches the matched fields from the data packets according to a protocol matching rule table and modifies the data packets' field for fast efficiently improvement.

Accordingly, one embodiment of the present invention is to provide an apparatus for layer-2 to layer-7 search engine for high-speed network application, which includes: a media access controller (MAC) connecting a computer network and receiving a plurality of data packets; a packet parser electrically coupled to the media access controller to parse the data packets; a plurality of protocol search engines electrically coupled to the packet parser and searching a plurality of matched fields from the data packets according to at least a protocol matching rule table; a search resolution engine electrically coupled to the protocol search engines and choosing a plurality of target fields from the matched fields with highest priority; and a packet modifier electrically coupled to the search resolution engine and modifying the packet headers.

In addition, a method for layer-2 to layer-7 search engine for high-speed network application includes: receiving a plurality of data packets from a computer network; parsing the data packets; searching a plurality of matched fields from the data packets according to at least a protocol matching rule table; choosing a plurality target fields from the matched fields with highest priority; and modifying the packet headers.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF SPECIFIC EMBODIMENTS

The present invention provides an apparatus and system for layer-2 to layer-7 search engine for high-speed network application.

Figure 1:
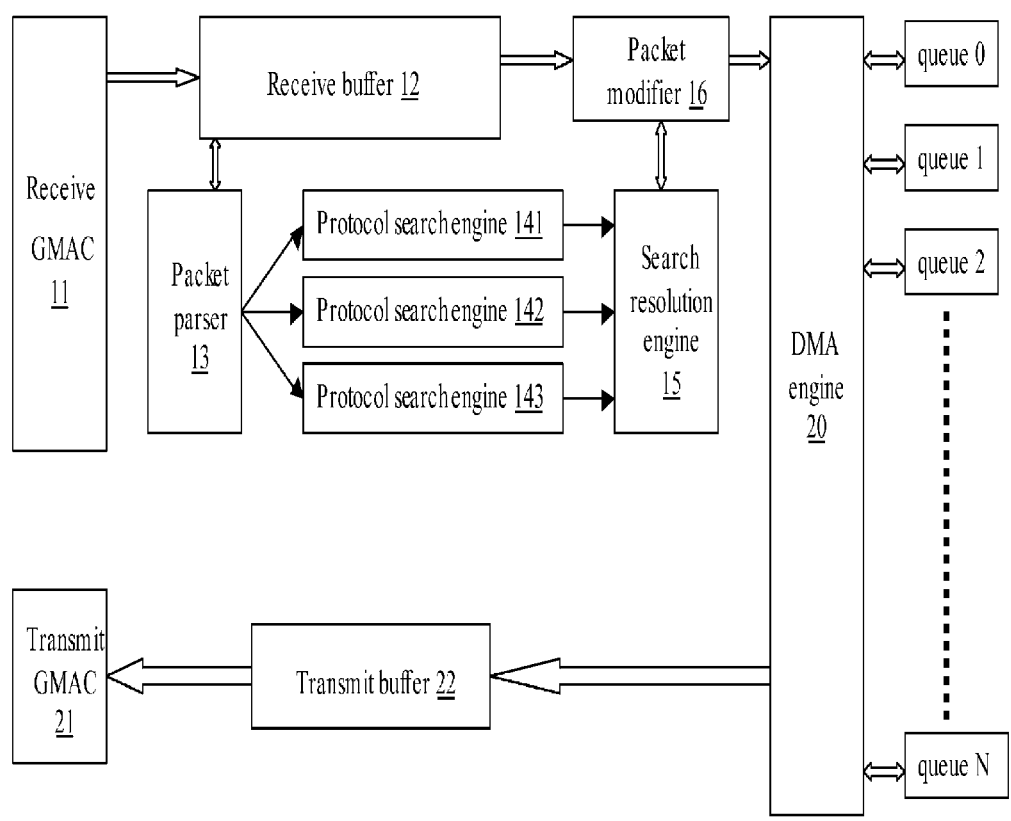
FIG. 1 is the block diagram of the layer-2 to layer-7 hardware search engine according to the embodiment of the present invention.

FIG. 1 shows the block diagram of the layer-2 to layer-7 hardware search engine according to the embodiment of the present invention. A receive GMAC (Gigabit Ethernet Media Access Controller) 11 connects to a computer network (not shown) and receives some data packets. A packet parser 13 is electrically coupled to the receive GMAC 11 to parse the data packets. A plurality of protocol search engines 141, 142 and 143 are electrically coupled to the packet parser 13 and search some matched fields from the data packets according to a protocol matching rule table. A search resolution engine 15 is electrically coupled to the protocol search engines 141, 142 and 143 and chooses a plurality of target fields from the matched fields with highest priority. And a packet modifier 16 is electrically coupled to the search resolution engine 15 and modifies the data packets. In addition there is a receive buffer 12 electrically coupled to the receive GMAC 11 and the packet parser 13 to store the data packets.

Furthermore, a DMA (Direct Memory Access) engine 20 receives the data packets from the packet modifier 16 and transfers the data packets to a plurality of queues (queue 0, queue 1, queue 2 ... queue N), which store the data packets for later access. A transmit buffer 22 stores some data packets transferred from DMA (Direct Memory Access) engine 20, then a transmit GMAC 21 transfers the data packets to the computer network.

When the packets are received from the receive GMAC 11, they will be temporally stored into the receive buffer 12. The packet parser 13 parses the received packets from the receive buffer 12 and then extracts the fields for some protocol search engines, such as protocol search engines 141, 142 and 143.

The fields include layer-2 header fields such as MAC DA/SA (Destination/Source) address, VLAN-ID (Virtual Local Area Network-ID), Ethernet Type fields, PPPoE (Point-to-Point Protocol over Ethernet) session ID, layer-3 headers fields such as IPv4 or IPv6 source/destination IP address, TOS field (Type of Service), flow label etc., layer-4 bytes such as TCP/UDP source/destination port number, IPSec (IP Security) field, etc. and layer-7 bytes, such as application specified fields, etc.

With the results from the protocol search engines 141, 142 and 143, a search resolution engine 15 chooses the matching one with highest priority, which is programmable according to the applications.

The packet modifier 16 will then modify the packet header based on the action parameters of the search results. The actions include modifying MAC DA/SA address, inserting/replacing/removing the VLAN or PPPoE headers, modifying the source/destination IP address, decrementing TTL (Time to Live) field and modifying the TCP/UDP source/destination port numbers.

After packet header modification, the packet will be forwarded to the destination port/queue of the search results. It could be forwarded to the software-based queue for termination at the host CPU or to the hardware transmit queue for applications such as switching/routing/NAT (Network Address Translation). Also, the packet could be discarded based on the action of the search result.

With the hardware forwarding capability, after proper setup of the protocol matching rule table, packets could be searched, modified and forwarded from receive to transmit by hardware, without using CPU resource.

Table 1 shows the protocol matching rule format, in which, layer-2/3/4/7 can be individually enabled or disabled. Port identifier (PortID) can be the matching parameter. Since there might be multiple rules being matched for a received packet, the rule priority is used to select which rule will be taken when multiple rules are matched. For layer-2 and layer-3 headers, predefined fields (such as layer-2's MAC addresses or layer-3's IP addresses) are used for rule matching. For layer-4 and layer-7 headers, each byte can be individually selected starting from the first byte of the headers.

TABLE 1

| L2/L3/L4/L7/ PortID Enables | Rule Priority | L2 field selects | L3 field selects | L4 byte selects | L7 byte selects |
| --- | --- | --- | --- | --- | --- |

Table 2 shows the L2/L3/L4/L7 connection hash table format. Rule number specifies which rule the current hash entry belongs to. The hash key is variable length and used to match the incoming packets belonging to certain protocol search engine. Destination port/queue ID is used for the DMA (Direct Memory Access) engine 20 to send the packet to the destination, which can be the output queue of the outgoing port or the receive queues for software consumption. Actions and parameters are used to modify packet header contents by hardware, such as modifying layer-2 MAC address, layer-3 IP address, layer-4 TCP/UDP port numbers or decrementing IP header's TTL field.

TABLE 2

| Rule number | Key (variable length) | Destination Port/Queue ID | Actions | Parameters |
| --- | --- | --- | --- | --- |

Figure 2:
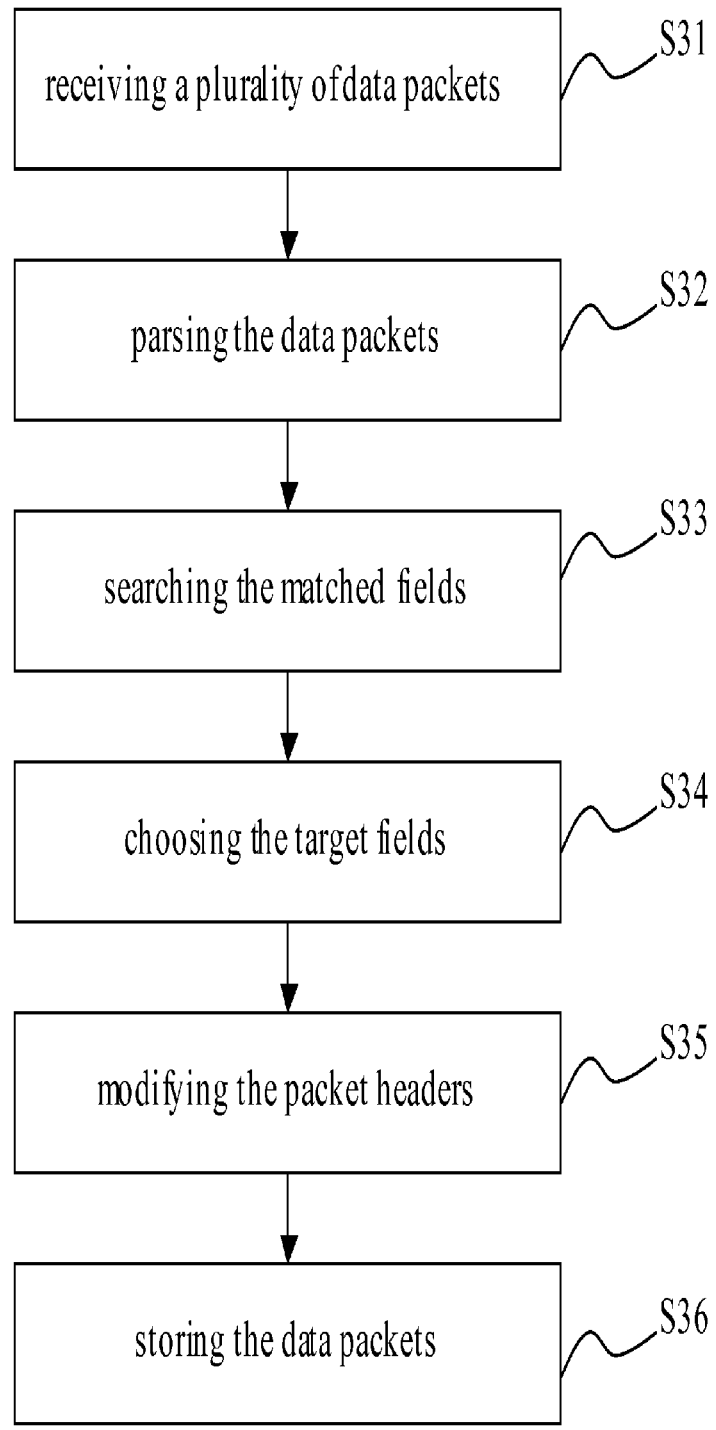
FIG. 2 is the flow chart of the search engine's process according to the embodiment of the present invention.

Accordingly, the present invention provides a method for layer-2 to layer-7 search engine for high-speed network application. Referring to FIG. 2, which is the flow chart of the search engine's process according to one embodiment of the present invention, the method includes: step S31 receiving a plurality of data packets from a computer network; step S32 parsing the data packets to extract a plurality of fields in each of the data packets; step S33 searching a plurality of matched fields from the data packets according to a protocol matching rule table; step S34 choosing a plurality of target fields from the matched fields with highest priority; step S35 modifying the packet headers; and step S36 storing the data packets into a plurality of queues.

With this hardware search engine data structure specified in Table 1 and 2, many different kinds of high speed networking functions may be implemented. For layer-2 switch, MAC DA address and IEEE802.1Q VLAN ID can be the hash key to find out the outgoing port ID/queue and packets will be forwarded to the destination by hardware. For layer-3 router, destination IP address with subnet mask will be used as hash key to search the destination and the IP header's TTL field will be decremented with header checksum recalculated. For firewall router, the source/destination IP address and/or source/destination TCP/UDP port numbers can be the hash key to filter out certain malicious hosts and applications. For NAT gateway, IP protocol number, source/destination IP address and source/destination TCP/UDP port number could be the hash key and the action could be replacing the MAC DA/SA address and replacing the source or destination IP and TCP/UDP port number. Packets will be forwarded to the hardware transmit port/queue in this case.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. An apparatus for layer-2 to layer-7 search engine for high-speed network application, comprising:
    a media access controller (MAC) connecting a computer network and receiving a plurality of data packets;
    a packet parser electrically coupled to the media access controller to parse the data packets;
    a plurality of protocol search engines electrically coupled to the packet parser and searching a plurality of matched fields from the data packets according to at least a protocol matching rule table and a connection hash table, wherein the connection hash table includes a hash key for matching the data packets to one of the protocol search engines with layer-2, layer-3, layer-4, and layer-7 headers selected by the protocol matching rule table;
    a search resolution engine electrically coupled to the protocol search engines and choosing a plurality of target fields from the matched fields with a highest priority;
    a packet modifier electrically coupled to the search resolution engine and modifying the packet headers;
    a Direct Memory Access (DMA) engine for receiving the data packets from the packet modifier; and
    a transmit buffer for storing the data packets transferred from the Direct Memory Access (DMA) engine.

2. The apparatus for layer-2 to layer-7 search engine for high-speed network application according to claim 1, wherein the computer network is a gigabit Ethernet.

3. The apparatus for layer-2 to layer-7 search engine for high-speed network application according to claim 1, further comprising a buffer electrically coupled to the media access controller and the packet parser to store the data packets.

4. The apparatus for layer-2 to layer-7 search engine for high-speed network application according to claim 1, wherein the packet parser extracts a plurality of fields in each of the data packets.

5. The apparatus for layer-2 to layer-7 search engine for high-speed network application according to claim 4, wherein the fields are selected from layer-2 header fields, layer-3 headers fields, layer-4 bytes, and layer-7 bytes.

6. The apparatus for layer-2 to layer-7 search engine for high-speed network application according to claim 5, wherein the layer-2 header fields are Media Access Control (MAC) destination address/source address (DA/SA), Virtual Local Area Network-ID (VLAN-ID), Ethernet Type fields, Point-to-Point Protocol over Ethernet (PPPoE) session ID.

7. The apparatus for layer-2 to layer-7 search engine for high-speed network application according to claim 5, wherein the layer-3 headers fields are IPv4 or IPv6 source/destination IP address, Type of Service (TOS) field, or flow label.

8. The apparatus for layer-2 to layer-7 search engine for high-speed network application according to claim 5, wherein the layer-4 bytes are TCP source/destination port number, UDP source/destination port number, IPSec (IP Security) field.

9. The apparatus for layer-2 to layer-7 search engine for high-speed network application according to claim 5, wherein the layer-7 bytes are application specified fields.

10. The apparatus for layer-2 to layer-7 search engine for high-speed network application according to claim 1, further comprising a plurality of queues storing the data packets from the Direct Memory Access (DMA) engine and a transmit Gigabit Ethernet Media Access Controller (GMAC) transferring the data packets stored in the transmit buffer.

11. A method for layer-2 to layer-7 search engine for high-speed network application, comprising:
    receiving a plurality of data packets from a computer network;
    parsing the data packets;
    searching a plurality of matched fields from the data packets according to at least a protocol matching rule table and a connection hash table, wherein the connection hash table includes a hash key for matching the data packets to one of protocol search engines with layer-2, layer-3, layer-4, and layer-7 headers selected by the protocol matching rule table;
    choosing a plurality target fields from the matched fields with highest priority;
    modifying the packet headers;
    receiving the data packets from a packet modifier by a Direct Memory Access (DMA) engine; and
    storing the data packets transferred from the Direct Memory Access (DMA) engine by a transmit buffer.

12. The method for layer-2 to layer-7 search engine for high-speed network application according to claim 11, wherein the computer network is a gigabit Ethernet.

13. The method for layer-2 to layer-7 search engine for high-speed network application according to claim 11, wherein the step of parsing the data packets packet is extracting a plurality of fields in each of the data packets.

14. The method for layer-2 to layer-7 search engine for high-speed network application according to claim 13, wherein the fields are selected from layer-2 header fields, layer-3 headers fields, layer-4 bytes, and layer-7 bytes.

15. The method for layer-2 to layer-7 search engine for high-speed network application according to claim 14, wherein the layer-2 header fields are Media Access Control (MAC) destination address/source address (DA/SA), Virtual Local Area Network-ID (VLAN-ID), Ethernet Type fields, Point-to-Point Protocol over Ethernet (PPPoE) session ID.

16. The method for layer-2 to layer-7 search engine for high-speed network application according to claim 14, wherein the layer-3 headers fields are IPv4 or IPv6 source/destination IP address, Type of Service (TOS) field or flow label.

17. The method for layer-2 to layer-7 search engine for high-speed network application according to claim 14, wherein the layer-4 bytes are TCP source/destination port number, UDP source/destination port number, and IPSec (IP Security) field.

18. The method for layer-2 to layer-7 search engine for high-speed network application according to claim 14, wherein the layer-7 bytes are application specified fields.

19. The method for layer-2 to layer-7 search engine for high-speed network application according to claim 11, further comprising storing the data packets into a plurality of queues.

* * * * *